UNITED STATES PATENT OFFICE.

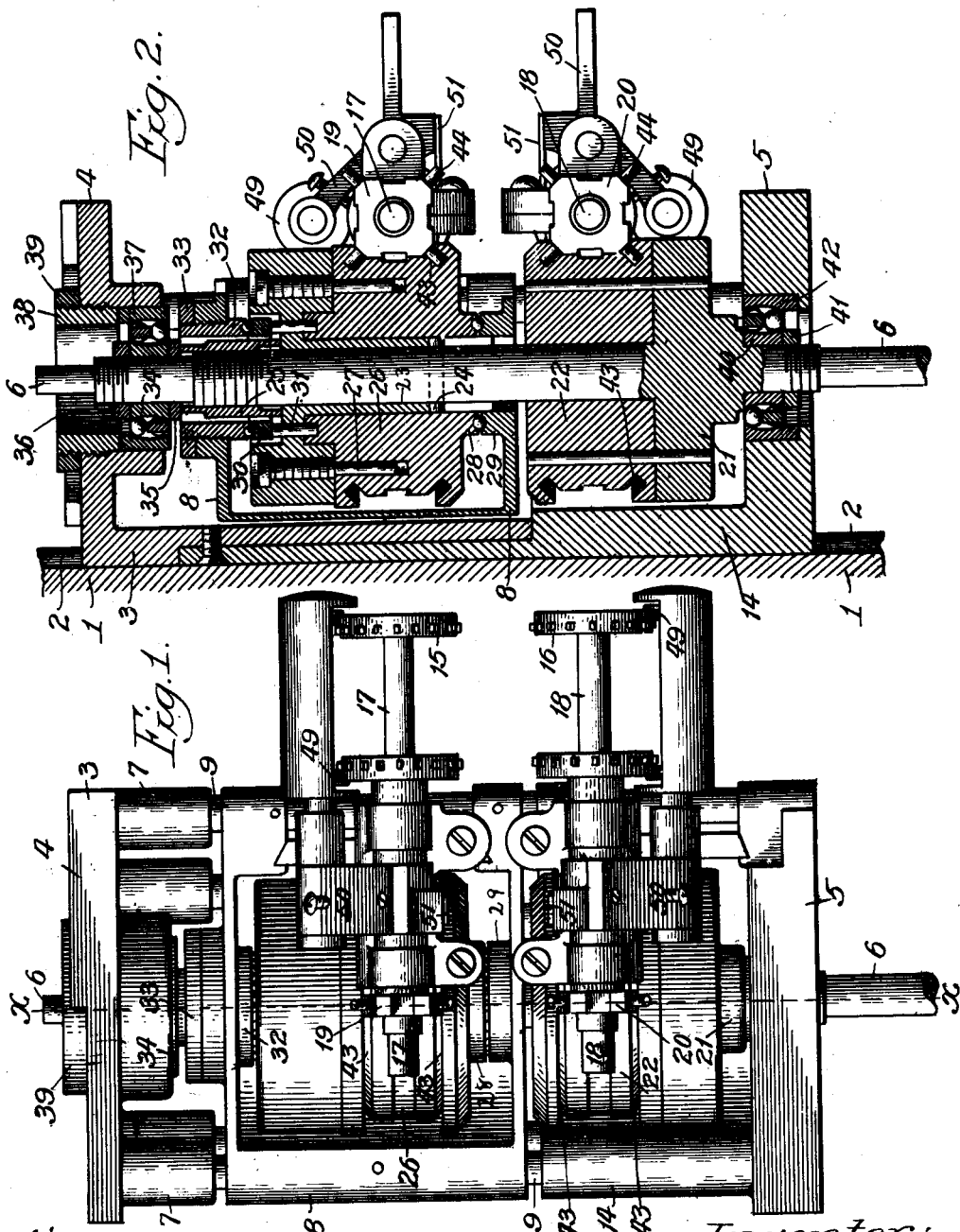

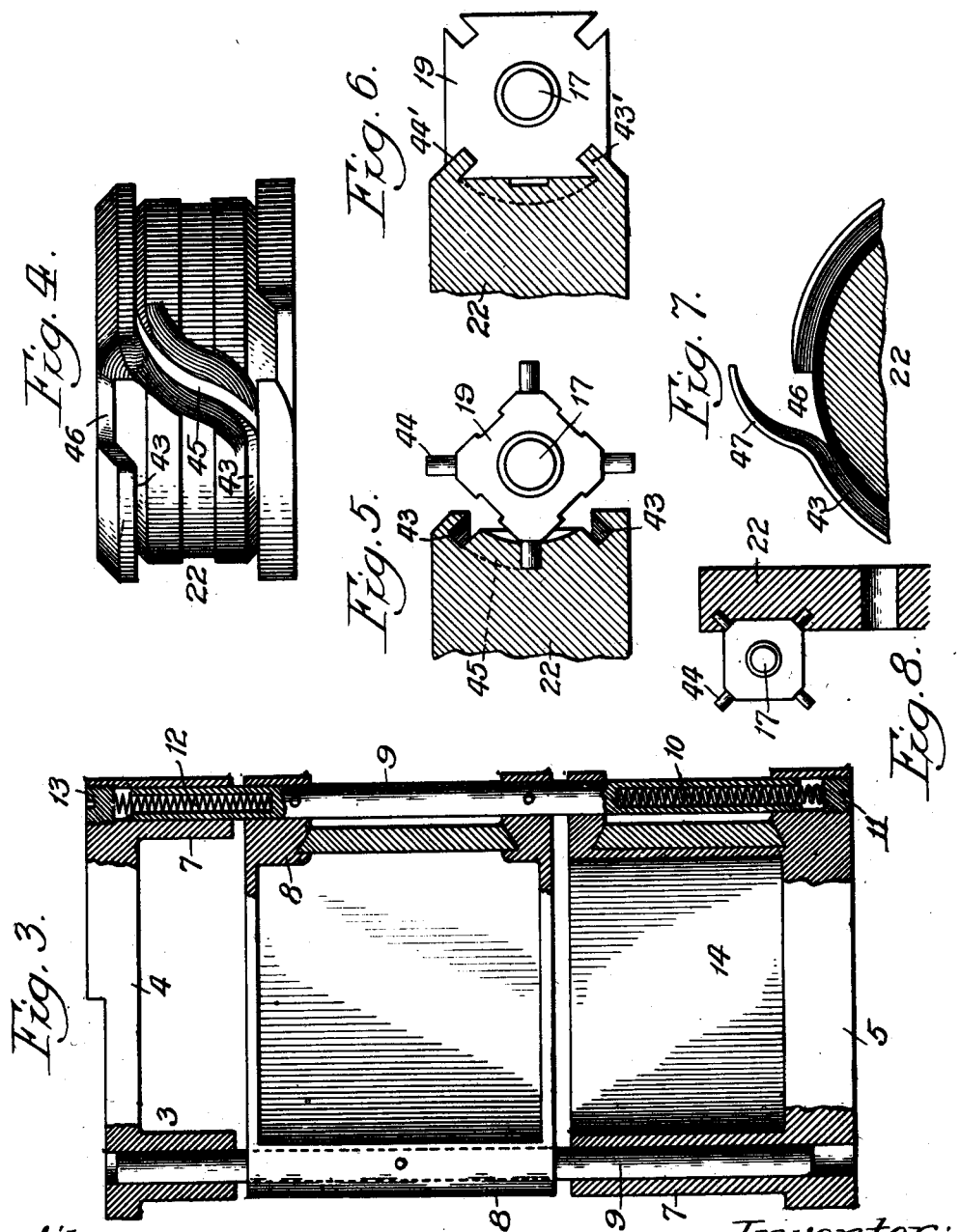

JOHN PROKSA, OF CHICAGO, ILLINOIS.

FILM-FEEDING MECHANISM.

1,170,991.   Specification of Letters Patent.   Patented Feb. 8, 1916.

Application filed February 13, 1914, Serial No. 818,586. Renewed July 6, 1915. Serial No. 38,259.

*To all whom it may concern:*

Be it known that I, JOHN PROKSA, a citizen of the United States of America, and a resident of Chicago, in the county of Cook, State of Illinois, have invented certain new and useful Improvements in Film-Feeding Mechanisms, of which the following is a specification.

This invention relates to that class of moving picture apparatus in which a picture strip or film is intermittently fed past the light opening or exposure point of the apparatus. And the present improvement has for its object, to provide a simple and efficient structural formation and combination of parts in the intermittent or step by step feeding mechanism of a moving picture apparatus, by means of which a rapid active movement or feed of the film is attained in an even manner and with the avoidance of initial jerking, and with which the film and its feeding accessories are effectively held in their position of rest, and lost motion between the parts prevented in a very effective manner.

A further object is to provide a simple and efficient arrangement of parts in the above mentioned class of film feeding mechanisms, whereby the portion of the film undergoing exposure is moved under tension and maintained in a tensioned condition during the period of rest or exposure, and with an avoidance of tremor or local lateral movement of the film during such period, all as will hereinafter more fully appear.

In the accompanying drawings: Figure 1, is a front elevation, illustrating the preferred form of the present film feeding mechanism. Fig. 2, is a transverse section, on line $x$—$x$, Fig. 1. Fig. 3, is a detail front elevation, partly in section, of the vertically adjustable carriage and the individual carrying frames of the present mechanism, the duplex film feeding mechanisms being removed from their position in said carrying frames. Fig. 4, is an enlarged side elevation of one of the cam disks or drums. Fig. 5, is a detail sectional elevation of a cam drum and its star wheel. Figs. 6, and 7 and 8, are detail views illustrating modified forms of the present invention.

Similar reference numerals indicate like parts in the several views.

Referring to the drawings, 1 represents a portion of a vertical wall of a moving picture apparatus of any usual and suitable construction, such wall being formed with a vertical recess 2 to constitute a guideway for the vertically adjustable carriage of the present intermittent film feeding mechanism by any usual and suitable manually actuated means, and with a view to attain the ordinary framing operation of the pictures of the strip or film, when the same are out of register with the light opening of the apparatus.

3 is the vertically adjustable carriage, above referred to, and which in the construction shown is formed with upper and lower horizontal heads or brackets 4 and 5, in which the vertically disposed driving shaft 6 of the film feeding mechanism is journaled, preferably by ball bearings as hereinafter described in detail. Said heads 4 and 5 are also formed with slideways, preferably in the form of upper and lower tubular sleeves 7, for the reception and guidance of the vertical guide members or rods of one of the carrying frames or housings in which the film feeding mechanisms are mounted.

8 is the carrying frame or housing above referred to, and which is provided with vertical guide members or rods 9, having vertical movement in the aforesaid tubular sleeves 7, of the carriage 3, above described.

10 is a coiled spring disposed within a hollow lower portion of one or more of the guide rods 9, with its upper end abutting against the upper end of said hollow portion. At its lower end said spring abuts against a screw plug 11 fitting the lower end of a lower tubular sleeve 7, aforesaid. As so arranged the spring 10 is adapted to exert a yielding upward stress upon the carrying frame 8, and impart thereto a tendency to move away from a fixed companion carrying frame, hereinafter described.

12 is a coiled spring of a lighter construction than the spring 10, above described, and disposed within the hollow upper portion of one or more of the guide rods 9. Said spring at its lower end has abutment on the lower end of said hollow portion of the guide rod, while the upper end of said spring has abutment against a screw plug 13 fitting the upper end of an upper tubular sleeve 7, aforesaid. As so arranged said lighter and weaker spring 12 acts as a cushion for the carrying frame 8, and prevents any violent vertical movement of said frame under the stress of the heavier and stronger spring 10, above described. The vertical movement of the carriage 8 takes place, when the spacings of the sprocket holes in the margin of the picture strip or film become irregular, due to irregular shrinkage, and the like, in the strip or film, and the purpose attained is a tensioning under all conditions of the portions of the strip or film which is immediately adjacent to the light opening of the apparatus.

14 is the fixed carrying frame or housing above referred to, and which is carried as a fixture on the vertically adjustable carriage 3, above described.

15 and 16 are a pair of counterpart film feeding sprocket drums disposed in separated relation above and below the usual light or exposure opening of a moving picture apparatus, and in the present improvement said film feeding drums are positively driven in unison so as to jointly effect the required intermittent or step by step feeding of the film, and to such end have an arrangement in detail as follows:

17 and 18 are the carrying shafts of the respective sprocket drums 15 and 16, aforesaid. Said shafts are journaled in individual bearings on the carrying frames 8 and 14, above described, and carry at their rear ends star wheels 19 and 20 adapted for operative engagement with the operating cam drums now to be described.

21 is a hub or collar formed as a fixture on the driving shaft 6, and providing a carrying means for the cam disk or drum 22, which has a cam formation hereinafter described for operative engagement with the star wheel 20 of the lower sprocket drum 16, aforesaid.

23 is a hub or carrying head having operative engagement at its lower end with the driving shaft 6, aforesaid, by a transverse pin 24 in said shaft, engaging in open ended slots in a central sleeve extension of said carrying head, as illustrated in Fig. 2.

25 is a clamping sleeve having a screw-threaded bore in engagement with a screw-threaded portion of the shaft 6, and having bearing against the upper end of the carrying head 23, to secure the same in place upon the shaft 6.

26 is a cam disk or drum, formed as a counterpart of the cam disk or drum 22 above described, and attached to the aforesaid carrying head 23, in a manner, which imposes uniform rotation on the parts, and which at the same time permits of an independent vertical movement of the cam drum 26, to and from the carrying head 23 in the practical operation of the present mechanism. In the construction shown, the described connection is attained by vertical guide studs or pins 27 carried by the head 23 and having engagement in vertical orifices formed therefor in the cam drum 26, as illustrated in Fig. 2. The said cam drum 26, is made with a cam formation hereinafter described, and adapting the same for operative engagement with the star wheel 19 of the upper film feeding drum 15, heretofore described.

28, is a ball race disposed on the under face of the cam drum 26, and adapted in connection with a series of balls and with a companion ball race 29 on the carrying frame 8, to provide a suitable bearing between the parts.

30 is an annular ball race disposed in an annular recess in the upper end of the carrying head 23, but having no direct connection therewith. In the present construction said ball race 30 is connected with the cam drum 26 by a series of posts 31, which are free to move in orifices formed therefor in the intervening portion of the carrying head 23, as shown in Fig. 2. With the described construction said annular ball race 30, in conjunction with a series of balls and with a companion ball race 32, secured to the carrying frame 8, in manner hereinafter described, is adapted to provide a suitable bearing between the parts. In the construction shown the periphery of the annular ball race 32 is screw-threaded, and has engagement with a screw-threaded orifice in the frame 8, so as to be vertically adjustable therein.

33 is a lock nut or collar engaging the ball race 32 to lock the same at its required adjustment.

34 is an annular inner ball race surrounding an upper portion of the shaft 6 and secured in place between the upper end of the clamping sleeve 25, above described, and an intermediate washer 35, by a nut or collar 36 screwing onto the shaft 6, above said ball race 34, as shown in Fig. 2.

37 is annular outer ball race disposed in an unthreaded portion of a vertical opening in the upper head or bracket 4 of the carriage 3, aforesaid, and adapted in connection with a series of balls, and with the aforesaid inner ball race 34, to provide a suitable upper bearing between the parts.

38 is an annular bushing screwing into the upper and screw-threaded portion of the above mentioned vertical opening in the bracket 4, and adapted to hold the outer annular ball race 37, above described, at the required adjustment.

39 is a lock nut or ring screwing on the upper end of the aforesaid bushing 38, to secure the same at the desired vertical adjustment.

40 is an inner annular ball race surrounding the lower portion of the shaft 6, and secured in place between the underside of the hub or collar 21, aforesaid, and a holding nut 41, screwed upon the shaft 6, as shown.

42 is an annular outer ball race disposed and held in a recess in the lower bracket 5 of the carriage 3, and adapted in connection with a series of balls and with the aforesaid inner ball race 40, to provide a suitable lower bearing between the parts.

In the preferred form of the present invention, as illustrated in Figs. 1, 2, 4 and 5, the cam disks or drums 22 and 26, heretofore referred to, are formed with cam grooves in their peripheries and said cam grooves are in turn of the specific form now to be described.

43 are a pair of oppositely inclined counterpart grooves formed in parallel relation in the periphery of each cam disk 22 and 26, and disposed in separated relation so that they will receive two radially adjacent and cylindrically formed prongs 44, of an individual star wheel 19 and 20, before described. And as shown the inclination of said grooves 43 will correspond with the radial disposition of the aforesaid prongs 44, in order that the same will snugly fit the grooves and prevent any independent movement of the star wheel while such engagement prevails.

45 is a spiral groove or passage formed in the periphery of each cam disk 22 and 26, aforesaid, and constituting communication between the pair of counterpart grooves 43 of each cam disk, and provide the necessary means for imparting the required partial rotation to an individual star wheel 19 or 20, on each revolution of a cam disk 22 or 26.

46 are lateral throats or passages connecting with and individual to the grooves 43, heretofore described, and adapted in the one case to permit the star wheel prongs 44 to successively pass into one of the grooves 43, and in the other case, to permit the said star wheel prongs 44, to successively pass out of the other of said grooves 43, in the continued operation of the mechanism.

With the described construction the star wheels 19, 20, are positively and effectively held from independent movement of rotation during their normal period of rest, by the described close and extended engagement of their prongs 44 with the pair of grooves 43, and in consequence, the portion of the picture film between the respective sprocket drums 15 and 16, is very effectively held from any movement during the described period of rest. In the said construction as the spiral groove 45 begins operative engagement with one of the star wheel prongs 44, the next star wheel prong, in advance, begins to leave its engagement with the groove 43, in which it had engagement, through the lateral throat or passage 46, of said groove. And as said spiral groove 45 nears the end of its operative engagement with the aforesaid star wheel prong, the next star wheel prong, to the rear, comes into engagement with the other groove 43, through its lateral throat or passage 46. And such engagement between the last mentioned prong and groove prevails until the cam disk in its circular movement brings said prong into operative engagement with the spiral groove 45 for a succeeding intermittent operation of the star wheel. And in that the first described prong as it moves out of the spiral groove 45, passes into the groove 43, which communicates with the tail end of said spiral groove, it follows that two of the star wheel prongs will be in holding engagement with the pair of grooves 43 of a cam disk 22 and 26, to effectively hold the star wheel against any independent rotation.

Ordinarily, the lateral throats 46, above described, will open laterally through the outer walls of the respective grooves 43, as shown in Fig. 4. When, however, it is desired to insure greater certainty in the entrance of the star wheel prongs into the initial one of said grooves 43, the outer wall of said groove will be provided with a curved deflector wing 47, as illustrated in Fig. 7, which wing is adapted to pass over an adjacent star wheel prong to direct and move said prong into said groove. The scope of this part of the present invention embraces a reverse formation of the cam grooves 43, 45 of each cam disk 22, 26, and radial prongs 44 of the star wheels 19, 20, and so that a peripheral rib 43' will take the place of the grooves 43, 45, and a radial recess 44' take the place of each individual star wheel prong 44, as illustrated in Fig. 6. The scope of the invention also embraces the disposal or formation of the cam grooves 43, 45, or cam ribs 43' in the side face of each cam disk 22 and 26, in manner indicated in Fig. 8.

49 are the usual idler drums by which the picture strip or film is held to engagement with the film feeding sprocket drums 15 and 16. And as usual in the present art the idler drums 49 will be mounted in swinging frames 50, which are yieldingly held in the required holding position by springs 51, and are adapted to be swung out of the way against the stress of the springs, in the operation of removing or replacing the film.

The four prong star wheels 19, 20, shown in the drawings, are preferred for projecting apparatus used in displaying moving pictures, in that sufficient length of picture strip or film is provided between the pair of feeding drums 15 and 16, to admit of the required framing operation required occasionally during the display of a lengthy reel of film. On the other hand three prong star wheels are preferred in apparatus for taking moving pictures, where no such fram-

Having thus fully described my said invention what I claim as new and desire to secure by Letters Patent, is:—

1. In an intermittent film feeding mechanism, the combination of a pair of carrying frames disposed in separated relation and movable to and from each other, individual film feeding sprocket drums mounted on said carrying frames, means for imparting positive and simultaneous rotation to the sprocket drums, and means associated with said frames and exerting a constant yielding stress upon one of the frames in a direction away from its companion frame, substantially as set forth.

2. In an intermittent film feeding mechanism, the combination of a pair of carrying frames disposed in separated relation and movable to and from each other, individual film feeding sprocket drums mounted on said carrying frames, means for imparting positive and simultaneous rotation to the sprocket drums, and resilient means exerting a constant stress upon one of the frames in a direction away from the companion frame, substantially as set forth.

3. In an intermittent film feeding mechanism, the combination of a pair of carrying frames disposed in separated relation, one of said frames being slidingly mounted, individual film feeding sprocket drums mounted on said carrying frames, means for imparting positive and simultaneous rotation to the sprocket drums, and resilient means for effecting a movement of the slidingly mounted carrying frame, substantially as set forth.

4. In an intermittent film feeding mechanism, the combination of a pair of sprocket drums disposed in separated relation and having carrying shafts, star wheels on said shafts, a pair of carrying frames having bearings for the aforesaid carrying shafts, a pair of cam disks individual to said carrying frames and having operative engagement with said star wheels, one of said carrying frames with its cam disk and accessories being movable in relation to the companion carrying frame, and means for imparting simultaneous rotation to said cam disks, substantially as set forth.

5. In an intermittent film feeding mechanism, the combination of a pair of sprocket drums disposed in separated relation and having carrying shafts, star wheels on said shafts, a pair of carrying frames having bearings for the aforesaid carrying shafts, a pair of cam disks associated with said carrying frames and each provided with a pair of holding grooves disposed in separated relation and with an operating spiral groove connecting said holding grooves, said grooves having operative engagement with the prongs of a star wheel, and means for imparting simultaneous rotation to cam disks, one of said carrying frames with its cam disk and accessories being movable in relation to a companion carrying frame, substantially as set forth.

6. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame away from said fixed carrying frame, a pair of sprocket drums having carrying shafts journaled in said carrying frames and provided with star wheels, and a pair of cam disks associated with said carrying frames and operatively connected to the operating shaft, substantially as set forth.

7. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame away from said fixed carrying frame, a pair of sprocket drums having carrying shafts journaled in said carrying frames and provided with star wheels, and a pair of cam disks associated with said carrying frames and operatively connected to the operating shaft, each cam disk being formed with a pair of holding grooves disposed in separated relation and with an operating spiral groove connecting said holding grooves, said grooves having operating engagement with the prongs of a star wheel, substantially as set forth.

8. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame away from said fixed carrying frame, a pair of sprocket drums having carrying shafts journaled in said carrying frames and provided with star wheels, a lower carrying hub on the operating shaft, a cam disk carried by said hub and having operative engagement with the star wheel of the lower sprocket drum, an upper carrying hub secured to the operating shaft by a central sleeve extension, and a companion cam disk journaled in the upper carrying frame and operatively connected to the upper carrying hub in a manner admitting of an independent movement of the cam disk to and from said carrying hub, substantially as set forth.

9. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame from said fixed carrying frame, a pair of sprocket drums having carrying shafts journaled in said carrying frames and provided with star wheels, a lower carrying hub on the operating shaft, a cam disk carried by said hub and having operative engagement with the star wheel of the lower sprocket drum, an upper carrying hub secured to the operating shaft by a central sleeve extension, and a companion cam disk journaled in the upper carrying frame and operatively connected to the upper carrying hub in a manner admitting of an independent movement of the cam disk to and from said carrying hub, each cam disk being formed with a pair of holding grooves disposed in separated relation and with an operating spiral groove connecting said holding grooves, said grooves having operative engagement with the prongs of a star wheel, substantially as set forth.

10. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame away from said fixed carrying frame, a pair of sprocket drums having carrying shafts journaled in said carrying frames and provided with star wheels, a lower carrying hub on the operating shaft, a cam disk carried by said hub and having operative engagement with the star wheel of the lower sprocket drum, an upper carrying hub secured to the operating shaft by a central sleeve extension, and a companion cam disk journaled in the upper carrying frame and operatively connected to the upper carrying hub by a series of vertical guide studs to admit of an independent movement of the cam disk to and from said carrying hub, substantially as set forth.

11. In an intermittent film feeding mechanism, the combination of a carriage having upper and lower bearings, an operating shaft journaled in said bearings, a movable carrying frame mounted on said carriage, a fixed carrying frame secured to said carriage, yielding means for moving the movable carrying frame away from said fixed carrying frame, a pair of sprocket drums having carrying shafts journaled in said carrying frames and provided with star wheels, a lower carrying hub on the operating shaft, a cam disk carried by said hub and having operative engagement with the star wheel of the lower sprocket drum, an upper carrying hub secured to the operating shaft by a central sleeve extension, and a companion cam disk journaled in the upper carrying frame by upper and lower ball bearings, the upper ball bearing having vertical posts connecting the same with said cam disk and passing through orifices in an intermediate portion of the aforesaid upper carrying hub, substantially as set forth.

Signed at Chicago, Illinois, this 9th day of February, 1914.

JOHN PROKSA.

Witnesses:
 ROBERT BURNS,
 JOHN ENDERS.